United States Patent
Ban et al.

(10) Patent No.: US 7,987,310 B2
(45) Date of Patent: Jul. 26, 2011

(54) SELF-CONFIGURING BUS FOR CONNECTING ELECTRONIC DEVICES

(75) Inventors: Oliver K. Ban, Austin, TX (US); William Bornstein, Hopewell Junction, NY (US); Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1127 days.

(21) Appl. No.: 11/306,780

(22) Filed: Jan. 11, 2006

(65) Prior Publication Data
US 2007/0174640 A1   Jul. 26, 2007

(51) Int. Cl.
  *G06F 13/14* (2006.01)
  *G06F 13/20* (2006.01)
  *G06F 13/36* (2006.01)
(52) U.S. Cl. .................. 710/305; 710/306; 710/313
(58) Field of Classification Search .................. 710/305, 710/306, 313
See application file for complete search history.

(56) References Cited

U.S. PATENT DOCUMENTS

| | | | |
|---|---|---|---|
| 5,675,813 A * | 10/1997 | Holmdahl | 713/310 |
| 5,871,368 A | 2/1999 | Erdner et al. | |
| 6,170,062 B1 * | 1/2001 | Henrie | 713/340 |
| 6,272,644 B1 * | 8/2001 | Urade et al. | 713/320 |
| 6,633,932 B1 | 10/2003 | Bork et al. | |
| 6,665,801 B1 * | 12/2003 | Weiss | 713/300 |
| 6,716,047 B2 * | 4/2004 | Milan | 439/284 |
| 2004/0255070 A1 * | 12/2004 | Larson et al. | 710/305 |

FOREIGN PATENT DOCUMENTS

EP           0854427 B1    4/2004
* cited by examiner

*Primary Examiner* — Mark Rinehart
*Assistant Examiner* — Jeremy S Cerullo
(74) *Attorney, Agent, or Firm* — DeLio & Peterson, LLC; Peter W. Peterson

(57) ABSTRACT

An apparatus for connecting electronic devices having a flexible cable bus housing containing a plurality of same or different communication and power channels extending along a length thereof and a plurality of bus ports at different locations along the bus housing length. Each bus port is capable of being operatively connected to one of the communication or power channels. The apparatus further includes a plurality of device connectors adapted to connect to a bus port at one end thereof and to a discrete device at another end thereof. Each connector at the device end has a different plug conforming to one of the communication or power channels. The apparatus preferably further includes a switch for connecting each bus port to the communication or power channel conforming to the device end plug when a device connector is connected to the bus port on the bus housing.

19 Claims, 1 Drawing Sheet

SELF-CONFIGURING BUS FOR CONNECTING ELECTRONIC DEVICES

BACKGROUND OF THE INVENTION

1. Field of the Invention

The present invention relates to an apparatus and method for providing data communication and power between discrete electronic devices and a central electronic device and, in particular, to a multi-function bus that contains a variety of functional wiring channels accessed along its length by connections that permit any of the supported functions to be exercised.

2. Description of Related Art

Most electronic devices used in computer applications and consumer electronics require cable connections for power and data transmission. A typical office workspace uses multiple devices or services such as printers, local area network (LAN) connections, audio speakers, external storage devices, and the like. Connection of these devices to one another results in an unsightly, confusing and potentially dangerous tangle of crisscrossed cables. A similar situation exists in a typical home entertainment installation, where multiple discrete audio/video devices must be interconnected.

Such cable clutter is more than unsightly; it is highly inefficient and frustrating to the user. Time is wasted each time a device must be installed or uninstalled since access to the cable is often difficult and the jumble of cables makes knowing which cable to connect confusing.

Devices to reduce cable clutter generally comprise mechanical enclosures that bundle many cables together. Such devices improve the appearance of the cables, but do not reduce the number of cables involved, and so do not reduce the complexity of the interconnections. In fact such devices may increase the difficulty in reconfiguring, troubleshooting or replacing connections.

Given that many office or home installations require connections to be made at varying locations, to access devices at different physical locations, simple mechanical enclosures are often impractical since placing or removing cables from the installation is permitted only at the ends of the locations.

SUMMARY OF THE INVENTION

Bearing in mind the problems and deficiencies of the prior art, it is therefore an object of the present invention to provide an apparatus and method for connecting different electronic devices using a single bus or cable.

It is another object of the present invention to provide an electronic device connection apparatus capable of providing a number of functions, including data distribution and power supply, with each function being available throughout the length of the apparatus.

A further object of the invention is to provide an apparatus and method for connecting different electronic devices in a simple manner that is easy to set up, easy to change, easy to diagnose, and easy to reconfigure.

Yet another object is to provide an apparatus and method for connecting different electronic devices that effectively reduces cable clutter without requiring additional effort on the part of the user.

Still other objects and advantages of the invention will in part be obvious and will in part be apparent from the specification.

The above and other objects, which will be apparent to those skilled in art, are achieved in the present invention which is directed to an apparatus for connecting electronic devices comprising a bus housing containing a plurality of same or different communication or power channels extending along a length thereof and at least one bus port at a location along the bus housing length. Preferably there is a plurality of bus ports at different locations along the bus housing length. Each bus port is capable of being operatively connected to one of the communication or power channels. The apparatus further includes a plurality of device connectors adapted to connect to a bus port at one end thereof and to a discrete device at another end thereof. Each connector at the device end has a different plug conforming to one of the communication or power channels. The apparatus preferably further includes a switch for connecting each bus port to the communication or power channel conforming to the device end plug when a device connector is connected to the bus port on the bus housing.

The bus housing preferably comprises a flexible cable. The bus housing may include different data communication channels, such as USB, firewire or LAN channels, and the apparatus may include a connector to connect the data communication channel to a central device with which communication with a discrete device is desired. The bus housing may include at least one power channel and the apparatus may include a connector to connect the power channel to a power source. Preferably the bus housing includes at least one power channel and at least one data communication channel.

The switch may be disposed in the bus housing. The switch may comprise a circuit adapted to connect terminals on each bus port to any of the communication or power channels. Each device connector may include a selector that directs the switch to connect the bus port to the communication or power channel conforming to the device end plug when the device connector is connected to the bus port. Each device connector may include a circuit identification adapted to direct the switch to connect the bus port to the communication or power channel conforming to the device end plug when the device connector is connected to the bus port. Preferably, each bus port has common terminal connectors.

In another aspect, the present invention is directed to a method for connecting electronic devices comprising providing a bus housing containing a plurality of same or different communication or power channels extending along a length thereof, a plurality of bus ports at different locations along the bus housing length, with each bus port capable of being operatively connected to one of the communication or power channels, and a switch for connecting each bus port to a different one of the communication or power channels. There are also provided a plurality of device connectors adapted to connect to a bus port at one end thereof and to a discrete device at another end thereof, with each connector at the device end having a different plug conforming to one of the communication or power channels. The method includes selecting a device connector having a device end plug conforming to one of the communication or power channels, connecting the selected device connector with one of the bus ports on the bus housing, and switching the bus port connected to the selected device connector to the communication or power channel conforming to the device end plug on the selected device connector.

The switching may occur automatically upon connecting the selected device connector to the one of the bus ports on the bus housing, without further user input. Preferably the device connector includes a selector that causes the switching to connect the bus port to the communication or power channel conforming to the device end plug when the device connector is connected to the bus port, without further user input.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawing in which

DESCRIPTION OF THE PREFERRED EMBODIMENT

Figure 1:
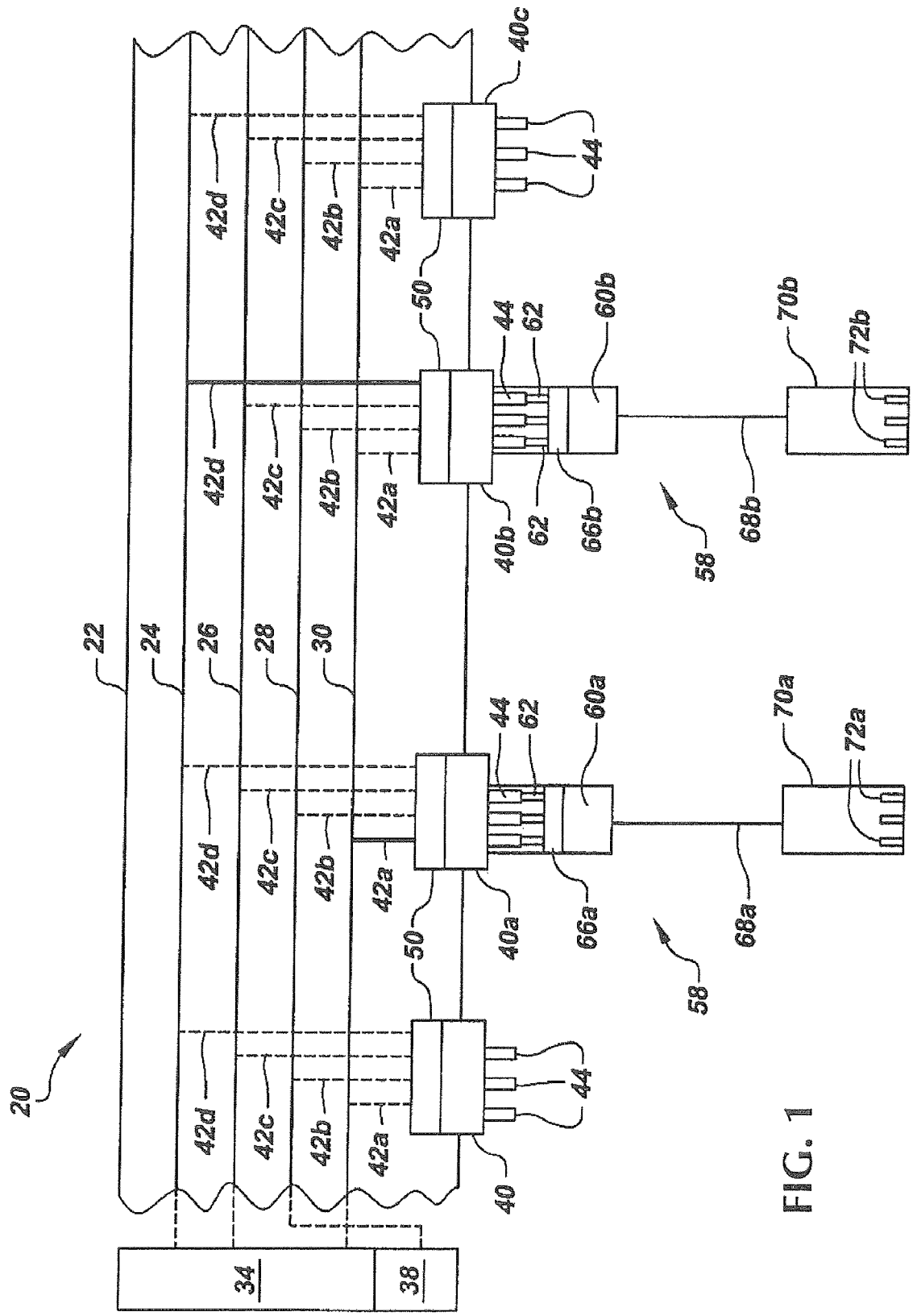
FIG. 1 is a schematic showing the connection of different types of discrete device connectors to the desired functional channels within a preferred embodiment of the multifunction bus of the present invention.

In describing the preferred embodiment of the present invention, reference will be made herein to the drawing Figure in which like numerals refer to like features of the invention.

The preferred embodiment of the present invention provides a multi-function bus that contains a variety of functional wiring channels and is accessed along its length by connections that permit any of the supported functions to be exercised. The connectors communicate to the bus wiring channels which function is needed, and switching circuitry inside the bus housing connects the appropriate functional wiring channel to that connector location.

The drawing Figure shows the preferred multi-function bus 20 comprising a flexible protective cable housing 22 through which extend a plurality of data and power channels or circuits along the length thereof. The data channels include, for example, otherwise standard communication channels such as a USB communication bus or channel 24, an Ethernet LAN bus 26 and a Firewire communication bus or channel 30. Other standard or non-standard communication channels may be used. Each is connected at the cable end to a computer 34 or other central electronic device with which data or other communication is required. Central electronic devices for which the present invention may be used include stand-alone computers and servers, as well as audio/video equipment such as televisions, audio/video recorders, and audio receivers and amplifiers. The multi-function cable housing also includes a power connector 28 connected at the cable end to an AC or DC power source 38, as required. Multiple power lines may be employed in cable housing 22 offering different types of power. It is understood that each bus or channel shown may consist of a plurality of otherwise standard wires or cables normally used for the functional data communication or power supply standard.

In order to access or tap the desired functional channel at a desired point along the cable length, there are provided a plurality of bus connection ports 40, 40a, 40b, 40c. These ports may be clustered or spaced apart along the cable 22 length as needed. Each port comprises a common configuration for terminals 44. Each port is also capable of being operatively connected to each of the functional channels 24, 26, 28, 30 within the bus 20. As shown, at each port a common interface consists of wiring 42a to the Firewire channel 30, wiring 42b to the power channel 28, wiring 42c to the Ethernet channel 26, and wiring 42d to the USB channel 24. A switch 50 associated with each port within bus 20 contains appropriate circuitry to connect the port terminals to the desired functional channel.

A plurality of jumper cables or device connectors 58 are provided to operatively connect the port to a discrete device to be connected to the multi-function bus 20. Each device connector preferably includes at one end a plug having a common configuration to compliment and connect with the bus port, and at the other end a plug having the standard configuration of whatever functional connection is desired. For example, a Firewire device connector comprises a port-standard plug 60a having terminals 62 that connect to terminals 44 of bus port 40a. At the other end a standard Firewire plug or connector 70a, containing standard Firewire terminals 72a, is available to connect to a discrete peripheral device having a Firewire connector to provide data communication. A standard Firewire cable 68a connects the port-standard and Firewire-standard plugs. In another example shown, a USB device connector again comprises a port-standard plug 60b having terminals 62 that connect to terminals 44 of bus port 40b. However, at the other end there is a standard USB plug or connector 70b, containing standard USB terminals 72b, is available to connect to a different discrete peripheral device having a USB connector to provide data communication. Standard USB cable 68b connects the port-standard and USB-standard plugs.

Switch 50 associated with each of the ports determines which functional channel communicates with the port. As shown, the switch associated with port 40a connects wiring 42a to the Firewire bus channel 30, to permit Firewire-standard communication with connector 70a. Likewise, the switch associated with port 40b connects wiring 42d to the USB bus channel 24, to permit USB-standard communication with connector 70b. While each switch may be individually operated as desired, preferably an identification circuit is provided in each discrete device connector 58 to automatically switch and configure the port to the correct functional channel. Thus, in the example shown, identification circuit 66a in the Firewire device connector transmits an ID signal through the port terminals to communicate to the switch associated with port 40a that the internal bus connection should be made with Firewire channel 30. Similarly, identification circuit 66b in the USB device connector transmits an ID signal through the port terminals to communicate to the switch associated with port 40b that the internal bus connection should be made with USB channel 24.

In operation, the multi-function bus 20 is connected to a central electronic device and the bus cable is laid out to extend near the various discrete devices to be connected to the central electronic device. Preferably, the bus ports are present at numerous locations along the cable length so that at least one port is near each discrete device. For the desired mode of communication or power with each discrete device, the proper type of device connector is selected and connected between the bus port and the discrete device to provide an operative data or power communication with the central device. Preferably, the selected device connector provides to the port an identification signal of the particular type of connector channel to be used, and upon receipt of the signal the port is automatically switched to connect to that channel within the bus cable.

The present invention permits a single bus to support any number of functions, including data distribution and power supply, with each function being available throughout the length of the bus. The automatic switches make the bus self-configuring for the particular type of port connection desired. Using this invention will allow devices to be connected in a simple manner that is easy to set up, easy to change, easy to diagnose, and easy to reconfigure. The present invention effectively reduces cable clutter without requiring an additional effort on the part of the user.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention,

What is claimed is:
1. An apparatus for connecting electronic devices comprising:
    a bus housing containing a plurality of same or different communication or power channels extending along a length thereof;

at least one bus port at a location along the bus housing length away from an end thereof, the at least one bus port capable of being operatively connected to one of the communication or power channels;

a plurality of device connectors adapted to connect to a bus port at one end thereof and to a discrete device at another end thereof, each connector at the port end having a common configuration to connect to the bus port and at the device end having a different plug conforming to one of the communication or power channels; and a switch at the at least one bus port for connecting the at least one bus port to the communication or power channel conforming to the device end plug when a device connector is connected to the bus port on the bus housing.

2. The apparatus of claim 1 wherein the bus housing comprising a flexible cable and includes different data communication channels selected from the group consisting of USB, firewire and LAN channels, and further including a connector to connect the data communication channel to a central device with which communication with a discrete device is desired.

3. The apparatus of claim 1 wherein the switch comprises a circuit adapted to connect terminals on each bus port to any of the communication or power channels, and is disposed in the bus housing.

4. The apparatus of claim 1 wherein the bus housing includes at least one power channel and including a connector to connect the power channel to a power source.

5. The apparatus of claim 1 wherein each device connector includes a selector that directs the switch to connect the bus port to the communication or power channel conforming to the device end plug when the device connector is connected to the bus port.

6. An apparatus for connecting electronic devices comprising:

a bus housing containing a plurality of same or different communication or power channels extending along a length thereof;

a plurality of bus ports at different locations along the bus housing length, each bus port capable of being operatively connected to one of the communication or power channels;

a plurality of device connectors adapted to connect to a bus port at one end thereof and to a discrete device at another end thereof, each connector at the port end having a common configuration to connect to the bus port and at the device end having a different plug conforming to one of the communication or power channels; and a switch at each bus port for connecting each bus port to the communication or power channel conforming to the device end plug when a device connector is connected to the bus port on the bus housing.

7. The apparatus of claim 6 wherein the bus housing includes different data communication channels and further including a connector to connect the data communication channel to a central device with which communication with a discrete device is desired.

8. The apparatus of claim 6 wherein the bus housing includes at least one power channel and including a connector to connect the power channel to a power source.

9. The apparatus of claim 6 wherein the bus housing includes data communication channels selected from the group consisting of USB, firewire and LAN channels.

10. The apparatus of claim 6 wherein the bus housing includes at least one power channel and at least one data communication channel.

11. The apparatus of claim 6 wherein the switch is disposed in the bus housing.

12. The apparatus of claim 6 wherein each device connector includes a selector that directs the switch to connect the bus port to the communication or power channel conforming to the device end plug when the device connector is connected to the bus port.

13. The bus of claim 6 wherein the switch comprises a circuit adapted to connect terminals on each bus port to any of the communication or power channels.

14. The bus of claim 6 wherein each device connector includes a circuit identification adapted to direct the switch to connect the bus port to the communication or power channel conforming to the device end plug when the device connector is connected to the bus port.

15. The apparatus of claim 6 wherein the bus housing comprises a flexible cable.

16. The apparatus of claim 6 wherein each bus port has common terminal connectors.

17. A method for connecting electronic devices comprising:

providing a bus housing containing a plurality of same or different communication or power channels extending along a length thereof, a plurality of bus ports at different locations along the bus housing length, each bus port capable of being operatively connected to one of the communication or power channels, and a switch at each bus port for connecting each bus port to a different one of the communication or power channels;

providing a plurality of device connectors adapted to connect to a bus port at one end thereof and to a discrete device at another end thereof, each connector at the port end having a common configuration to connect to the bus port and at the device end having a different plug conforming to one of the communication or power channels;

selecting a device connector having a device end plug conforming to one of the communication or power channels;

connecting the port end of the selected device connector with one of the bus ports on the bus housing; and switching the bus port connected to the selected device connector to the communication or power channel conforming to the device end plug on the selected device connector.

18. The method of claim 17 wherein the switching occurs automatically upon connecting the selected device connector to the one of the bus ports on the bus housing, without further user input.

19. The method of claim 17 wherein the device connector includes a selector that causes the switching to connect the bus port to the communication or power channel conforming to the device end plug when the device connector is connected to the bus port, without further user input.

* * * * *